US012664974B2

(12) United States Patent
Wu et al.

(10) Patent No.: US 12,664,974 B2
(45) Date of Patent: Jun. 23, 2026

(54) TRAINING SPEECH PROCESSING MODELS USING PSEUDO TOKENS

(71) Applicant: ASAPP, INC., New York, NY (US)

(72) Inventors: Felix Wu, Ithaca, NY (US); Kwangyoun Kim, Santa Clara, CA (US); Ryan Thomas McDonald, London (GB); Kilian Quirin Weinberger, Ithaca, NY (US); Kyu Jeong Han, Pleasanton, CA (US); Yoav Artzi, New York, NY (US)

(73) Assignee: ASAPP, INC., New York, NY (US)

( * ) Notice: Subject to any disclaimer, the term of this patent is extended or adjusted under 35 U.S.C. 154(b) by 563 days.

(21) Appl. No.: 17/859,957

(22) Filed: Jul. 7, 2022

(65) Prior Publication Data

US 2023/0237990 A1     Jul. 27, 2023

Related U.S. Application Data

(60) Provisional application No. 63/303,821, filed on Jan. 27, 2022.

(51) Int. Cl.
*G10L 15/06* (2013.01)
*G06N 3/045* (2023.01)
(Continued)

(52) U.S. Cl.
CPC ............ *G10L 15/063* (2013.01); *G06N 3/045* (2023.01); *G10L 15/16* (2013.01); *G10L 15/22* (2013.01); *G10L 15/30* (2013.01)

(58) Field of Classification Search
CPC .......... G06N 3/045; G06N 3/08; G06N 20/00; G06N 3/02; G10L 15/02; G10L 15/16
See application file for complete search history.

(56) References Cited

U.S. PATENT DOCUMENTS 8,447,604 B1 *   5/2013   Chang .................. H04N 21/435
                                                   704/235
2017/0372201 A1   12/2017   Gupta et al.
(Continued)

OTHER PUBLICATIONS

Amodei, Dario et al., "Deep speech 2: End-to-end speech recognition in english and mandarin", International conference on machine learning, PMLR, 2016, pp. 173-182.
(Continued)

*Primary Examiner* — Mark Villena
(74) *Attorney, Agent, or Firm* — GTC Law Group PC & Affiliates

(57) ABSTRACT

A speech processing model may be trained using pseudo tokens. Training a speech processing model with pseudo tokens may allow for training with a smaller amount of labeled training data and accordingly lower costs. A set of pseudo tokens may be determined by computing feature vectors from unlabeled training data, clustering the feature vectors, and performing token compression using the clustered feature vectors. A first speech processing model may be trained using unlabeled training data by determining sequences of pseudo tokens corresponding to the unlabeled training data. A second speech processing model may be initialized using the first speech processing model and then trained using labeled training data. The second speech processing model may then be deployed to a speech processing application.

20 Claims, 8 Drawing Sheets

(51) Int. Cl.
| | |
|---|---|
| *G10L 15/16* | (2006.01) |
| *G10L 15/22* | (2006.01) |
| *G10L 15/30* | (2013.01) |

(56) References Cited

U.S. PATENT DOCUMENTS

| | | | | |
|---|---|---|---|---|
| 2019/0180175 A1* | 6/2019 | Meteer | | G10L 15/26 |
| 2020/0175961 A1* | 6/2020 | Thomson | | G10L 15/28 |
| 2021/0110813 A1* | 4/2021 | Khoury | | G10L 15/063 |
| 2021/0157983 A1* | 5/2021 | Kalluri | | G06F 40/216 |
| 2022/0101112 A1* | 3/2022 | Brown | | G10L 15/18 |
| 2022/0129749 A1* | 4/2022 | Moritz | | G06N 3/082 |
| 2022/0310113 A1* | 9/2022 | Tzinis | | G06V 10/82 |
| 2022/0374766 A1* | 11/2022 | Thorsley | | G06N 3/045 |
| 2023/0040181 A1* | 2/2023 | Neelagiri | | G10L 15/18 |
| 2023/0078698 A1* | 3/2023 | Shnarch | | G06F 40/279 704/9 |
| 2023/0196710 A1* | 6/2023 | Pan | | G06N 3/092 382/173 |
| 2025/0061277 A1* | 2/2025 | Zhu | | G06F 40/284 |

OTHER PUBLICATIONS

Arthur, David et al., "k-means++: the advantages of careful seeding", SODA '07: Proceedings of the eighteenth annual ACM-SIAM symposium on Discrete algorithms, 2007, pp. 1027-1035.

Babu, Arun et al., "XLS-R: Self-supervised Cross-lingual Speech Representation Learning at Scale", arXiv:2111.09296v3 [cs.CL], https://arxiv.org/pdf/2111.09296 (accessed on Aug. 20, 2024), Dec. 16, 2021, 23 pages.

Baevski, Alexei et al., "data2vec: A General Framework for Self-supervised Learning in Speech, Vision and Language", arXiv:2202.03555v3 [cs.LG], https://arxiv.org/pdf/2202.03555 (accessed on Aug. 20, 2024), Oct. 25, 2022, 15 pages.

Baevski, Alexei et al., "Effectiveness of self-supervised pre-training for speech recognition", arXiv:1911.03912v3 [cs.CL], https://arxiv.org/pdf/1911.03912.pdf (accessed on Oct. 4, 2021), May 18, 2020, 8 pages.

Baevski, Alexei et al., "wav2vec 2.0: A Framework for Self-Supervised Learning of Speech Representations", arXiv:2006.11477v3 [cs.CL], https://arxiv.org/pdf/2006.11477.pdf (accessed on Oct. 4, 2021), Oct. 22, 2020, 19 pages.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Caron, Mathilde et al., "Emerging Properties in Self-Supervised Vision Transformers", arXiv:2104.14294v2 [cs.CV], https://arxiv.org/pdf/2104.14294 (accessed on Aug. 20, 2024), May 24, 2021, 21 pages.

Chan, William et al., "Listen, Attend and Spell: A neural network for large vocabulary conversational speech recognition", International Conference on Acoustics, Speech, and Signal Processing, pp. 4960-4964, 2016, arXiv:1508.01211v2 [cs.CL] Aug. 20, 2015, Aug. 20, 2015, 16 pages.

Chen, Sanyuan et al., "WavLM: Large-Scale Self-Supervised Pre-Training for Full Stack Speech Processing", arXiv:2110.13900v5 [cs.CL], https://arxiv.org/pdf/2110.13900 (accessed on Aug. 20, 2024), Jun. 17, 2022, 14 pages.

Chen, Ting et al., "A simple framework for contrastive learning of visual representations", Proceedings of the 37th International Conference on Machine Learning, Vienna, Austria, PMLR 119, 2020, ArXiv, abs/2002.05709v3 [cs.LG], Jul. 1, 2020, 20 pages.

Child, Rewon et al., "Generating Long Sequences with Sparse Transformers", arXiv:1904.10509v1 [cs.LG], https://arxiv.org/pdf/1904.10509 (accessed on Aug. 20, 2024), Apr. 23, 2019, 10 pages.

Chung, Yu-An et al., "W2v-BERT: Combining Contrastive Learning and Masked Language Modeling for Self-Supervised Speech Pre-Training", arXiv:2108.06209v2 [cs.LG], https://arxiv.org/pdf/2108.06209 (accessed on Aug. 20, 2024), Sep. 13, 2021, 7 pages.

Collobert, Ronan et al., "Wav2letter: an end-to-end convnet-based speech recognition system", ArXiv, abs/1609.03193v2 [cs.LG], Sep. 13, 2016, 8 pages.

Conneau, Alexis et al., "Unsupervised cross-lingual representation learning for speech recognition", ArXiv, abs/2006.13979v2 [cs.CL], Dec. 15, 2020, 12 pages.

Dai, Zihang et al., "Transformer-XL: Attentive Language Models Beyond a Fixed-Length Context", arXiv:1901.02860v3 [cs.LG], https://arxiv.org/pdf/1901.02860.pdf, Jun. 2, 2019, 20 pages.

Devlin, J. et al., "Bert: Pre-training of deep bidirectional transformers for language understanding", Proceedings of NAACL-HLT 2019, Minneapolis, Minnesota, Jun. 2-7, 2019, pp. 4171-4186.

Gage, Philip , "A New Algorithm for Data Compression", C Users J. 12(2):23-38, http://www.pennelynn.com/Documents/CUJ/HTML/94HTML/19940045.HTM (accessed on Aug. 19, 2024), Feb. 1994, 11 pages.

Ghannay, Sahar et al., "End-to-end named entity and semantic concept extraction from speech", IEEE Spoken Language Technology Workshop, Athens, Greece. hal-01987740v2, https://hal.science/hal-01987740v2/document, Dec. 2018, 9 pages.

Graves, Alex et al., "Connectionist temporal classification: Labelling unsegmented sequence data with recurrent neural networks", International Conference on Machine Learning, 2006, pp. 369-376.

Graves, Alex , "Sequence Transduction with Recurrent Neural Networks", arXiv:1211.3711v1 [cs.NE], https://arxiv.org/pdf/1211.3711.pdf, Nov. 14, 2012, 9 pages.

Grill, Jean-Bastien et al., "Bootstrap your own latent: A new approach to self-supervised learning", arXiv preprint arXiv:2006.07733v3 [cs.LG], Sep. 10, 2020, 35 pages.

Gulati, Anmol et al., "Conformer: Convolution-augmented Transformer for Speech Recognition", arXiv: 2005.08100v1 [eess.AS], https://arxiv.org/pdf/2005.08100.pdf, May 16, 2020, 5 pages.

Han, Wei et al., "ContextNet: Improving convolutional neural networks for automatic speech recognition with global context", arXiv:2005.03191v3 [eess.AS], https://arxiv.org/pdf/2005.03191.pdf, May 16, 2020, 5 pages.

He, Kaiming et al., "Momentum Contrast for Unsupervised Visual Representation Learning", CVPR, https://openaccess.thecvf.com/content_CVPR_2020/papers/He_Momentum_Contrast_for_Unsupervised_Visual_Representation_Learning_CVPR_2020_paper.pdf (accessed on Aug. 20, 2024), 2020, pp. 9729-9738.

Hsu, Wei-Ning et al., "Hubert: How much can a bad teacher benefit asr pre-training", Neural Information Processing Systems Workshop on Self-Supervised Learning for Speech and Audio Processing Workshop / arXiv:2106.07447v1 [cs.CL], Jun. 14, 2021, 10 pages.

Hsu, Wei-Ning et al., "HuBERT: Self-Supervised Speech Representation Learning by Masked Prediction of Hidden Units", IEEE/ACM Trans. Audio, Speech and Lang. Proc., vol. 29, 2021, pp. 3451-3460.

Hsu, Wei-Ning et al., "Robust wav2vec 2.0: Analyzing domain shift in self-supervised pre-training", ArXiv, abs/2104.01027v2 [cs.SD], Sep. 8, 2021, 9 pages.

Inaguma, Hirofumi et al., "ESPnet-ST: All-in-One Speech Translation Toolkit", arXiv:2004.10234v2 [cs.CL], https://arxiv.org/pdf/2004.10234 (accessed on Aug. 20, 2024), Sep. 30, 2020, 10 pages.

Kahn, J. et al., "Libri-Light: A benchmark for ASR with limited or no supervision", [Online]. Available: http://arxiv.org/abs/1912.07875, 2019, 8 pages.

Kahn, Jacob et al., "Librilight: A benchmark for asr with limited or no supervision", ICASSP 2020—2020 IEEE International Conference on Acoustics, Speech and Signal Processing (ICASSP), https://github.com/facebookresearch/libri-light (accessed on Aug. 20, 2024), 2020, pp. 7669-7673.

Kudo, Taku et al., "SentencePiece: A simple and language independent subword tokenizer and detokenizer for Neural Text Processing", Proceedings of the 2018 Conference on Empirical Methods in Natural Language Processing (System Demonstrations), Brussels, Belgium, Oct. 31-Nov. 4, 2018., pp. 66-71.

Kudo, Taku , "Subword Regularization: Improving Neural Network Translation Models with Multiple Subword Candidates", Proceedings of the 56th Annual Meeting of the Association for Computational Linguistics (vol. 1: Long Papers), Melbourne, Australia, Jul. 15-20, 2018, pp. 66-75.

(56) References Cited

OTHER PUBLICATIONS

Lai, Cheng-I J. et al., "PARP: Prune, Adjust and Re-Prune for Self-Supervised Speech Recognition", arXiv:2106.05933v2 [cs.CL], https://arxiv.org/pdf/2106.05933 (accessed on Aug. 20, 2024), Oct. 26, 2021, 53 pages.

Lakhotia, Kushal et al., "On Generative Spoken Language Modeling from Raw Audio", arXiv:2102.01192v2 [cs.CL], https://arxiv.org/pdf/2102.01192 (accessed on Aug. 20, 2024), Sep. 9, 2021, 20 pages.

Lewis, Mike et al., "BART: Denoising Sequence-to-Sequence Pretraining for Natural Language Generation, Translation, and Comprehension", Proceedings of the 58th Annual Meeting of the Association for Computational Linguistics, 2020 Association for Computational Linguistics, Jul. 5-10, 2020, pp. 7871-7880.

Li, Chunyuan et al., "Efficient Self-supervised Vision Transformers for Representation Learning", arXiv:2106.09785v2 [cs.CV], https://arxiv.org/pdf/2106.09785 (accessed Aug. 21, 2024), Jul. 6, 2022, 27 pages.

Li, Xian et al., "Multilingual Speech Translation with Efficient Finetuning of Pretrained Models", arXiv:2010.12829v4 [cs.CL], https://arxiv.org/pdf/2010.12829 (accessed on Aug. 21, 2024), Jan. 2, 2021, 12 pages.

Liu, Yinhan et al., "Multilingual Denoising Pre-training for Neural Machine Translation", Transactions of the Association for Computational Linguistics, vol. 8, 2020, pp. 726-742.

Liu, Yinhan et al., "RoBERTa: A Robustly Optimized BERT Pretraining Approach", arXiv:1907.11692v1 [cs.CL], Jul. 26, 2019, 13 Pages.

Mohamed, Abdelrahman et al., "Transformers with convolutional context for ASR", arXiv:1904.11660v2 [cs.CL], https://arxiv.org/pdf/1904.11660 (accessed on Aug. 21, 2024), Mar. 2, 2020, 5 pages.

Ott, Myle et al., "FAIRSEQ: A Fast, Extensible Toolkit for Sequence Modeling", Proceedings of NAACL-HLT 2019: Demonstration, arXiv:1904.01038v1 [cs.CL], http://128.84.21.203/pdf/1904.01038, Apr. 1, 2019, 6 pages.

Panayotov, Vassil et al., "Librispeech: An ASR Corpus Based On Public Domain Audio Books", 2015 IEEE International Conference on Acoustics, Speech and Signal Processing (ICASSP), 2015, pp. 5206-5210.

Pasad, Ankita et al., "On the Use of External Data for Spoken Named Entity Recognition", arXiv:2112.07648v2 [cs.CL], https://arxiv.org/pdf/2112.07648 (accessed on Aug. 21, 2024), Jul. 9, 2022, 14 pages.

Paszke, Adam et al., "PyTorch: An Imperative Style, High-Performance Deep Learning Library", Advances in Neural Information Processing Systems 32, 33rd Conference on Neural Information Processing Systems (NeurIPS 2019), Vancouver, Canada, https://proceedings.neurips.cc/paper/2019/file/bdbca288fee7f92f2bfa9f7012727740-Paper.pdf, 2019, 12 pages.

Pedregosa, Fabian et al., "Scikit-learn: Machine Learning in Python", Journal of Machine Learning Research, vol. 12, 2011, pp. 2825-2830.

Peters, Matthew E. et al., "Deep contextualized word representations", Proceedings of NAACL-HLT 2018, New Orleans, Louisiana, Jun. 1-6, 2018, pp. 2227-2237.

Pratap, Vineel et al., "Wav2letter++: A fast open-source speech recognition system", ICASSP 2019—2019 IEEE International Conference on Acoustics, Speech and Signal Processing (ICASSP), pp. 6460-6464, 2019, arXiv:1812.07625v1 [cs.CL], Dec. 18, 2018, 5 pages.

Qi, Weizhen et al., "ProphetNet: Predicting Future N-gram for Sequence-to-Sequence Pre-training", rXiv:2001.04063v3 [cs.CL], https://arxiv.org/pdf/2001.04063 (accessed on Aug. 21, 2024), Oct. 21, 2020, 10 pages.

Radford, Alec et al., "Language Models are Unsupervised Multitask Learners", Technical report, OpenAi, https://insightcivic.s3.us-east-1.amazonaws.com/language-models.pdf (accessed on Aug. 21, 2024), Feb. 14, 2019, 24 pages.

Raffel, Colin et al., "Exploring the Limits of Transfer Learning with a Unified Text-to-Text Transformer", Journal of Machine Learning Research 21 (2020) pp. 1-67, arXiv:1910.10683v4 [cs.LG] https://arxiv.org/pdf/1910.10683 (accessed on Aug. 21, 2024), Sep. 19, 2023, 67 pages.

Sanh, Victor et al., "Multitask Prompted Training Enables Zero-Shot Task Generalization", Published as a conference paper at ICLR 2022, arXiv:2110.08207v3 [cs.LG], https://arxiv.org/pdf/2110.08207 (accessed on Aug. 21, 2024), Mar. 17, 2022, 216 pages.

Schneider, Steffen et al., "wav2vec: Unsupervised pre-training for speech recognition", Interspeech, arXiv:1904.05862v4 [cs.CL], Sep. 11, 2019, 9 pages.

Sculley, D. , "Web-Scale K-Means Clustering", WWW 2010, Raleigh, NC, USA, https://citeseerx.ist.psu.edu/document?repid=rep1type=pdf&doi=b452a856a3e3d4d37b1de837996aa6813bedfdcf (accessed on Aug. 21, 2024), Apr. 26-30, 2010, 2 pages.

Shon, Suwon et al., "SLUE: New Benchmark Tasks for Spoken Language Understanding Evaluation on Natural Speech", arXiv:2111.10367v3 [cs.CL], https://arxiv.org/pdf/2111.10367 (accessed on Aug. 21, 2024), Jul. 29, 2022, 8 pages.

Sutskever, Ilya et al., "Sequence to Sequence Learning with Neural Networks", CoRR abs/1409.3215, http://arxiv.org/abs/1409.3215, 2014, 9 pages.

Van Den Oord, Aaron et al., "Representation learning with contrastive predictive coding", arXiv:1807.03748v2 [cs.LG], Jan. 22, 2019, 13 pages.

Wang, Changhan et al., "CoVoST 2 and Massively Multilingual Speech-to-Text Translation", arXiv:2007.10310v3 [cs.CL], https://arxiv.org/pdf/2007.10310 (accessed on Aug. 21, 2024), Oct. 24, 2020, 6 pages.

Wang, Changhan et al., "FAIRSEQ S2T: Fast Speech-to-Text Modeling with FAIRSEQ", arXiv:2010.05171v2 [cs.CL], https://arxiv.org/pdf/2010.05171 (accessed on Aug. 21, 2024), Jun. 14, 2022, 8 pages.

Wang, Changhan et al., "Large-scale self and semi-supervised learning for speech translation", arXiv:2104.06678v1 [cs.CL], Apr. 14, 2021, 5 pages.

Wang, Changhan et al., "Voxpopuli: A large-scale multilingual speech corpus for representation learning, semi-supervised learning and interpretation", arXiv:2101.00390v2 [cs.CL], Jul. 27, 2021, 11 pages.

Watanabe, Shinji et al., "ESPnet: End-to-End Speech Processing Toolkit", arXiv:1804.00015v1 [cs.CL], https://arxiv.org/pdf/1804.00015.pdf, Mar. 30, 2018, 5 pages.

Wu, Felix et al., "Performance-Efficiency Trade-offs in Unsupervised Pre-training for Speech Recognition", arXiv:2109.06870v1 [cs.CL], https://arxiv.org/pdf/2109.06870 (accessed on Aug. 21, 2024), Sep. 14, 2021, 19 pages.

Wu, Zhirong et al., "Unsupervised feature learning via non-parametric instance discrimination", CVPR, 2018, arXiv:1805.01978v1 [cs.CV], https://arxiv.org/pdf/1805.01978, May 5, 2018, 10 pages.

Xu, Qiantong et al., "Self-training and pre-training are complementary for speech recognition", arXiv:2010.11430v1 [cs.LG], Oct. 22, 2020, 8 pages.

Yadav, Hemant et al., "End-to-end Named Entity Recognition from English Speech", Interspeech 2020, arXiv:2005.11184v1 [cs.CL], https://arxiv.org/pdf/2005.11184 (accessed on Aug. 21, 2024), May 22, 2020, 5 pages.

Yang, Shu-Wen et al., "SUPERB: Speech processing Universal PERformance Benchmark", arXiv:2105.01051v4 [cs.CL], https://arxiv.org/pdf/2105.01051 (accessed on Aug. 21, 2024), Oct. 15, 2021, 6 pages.

Zhang, Jingqing et al., "PEGASUS: Pre-training with Extracted Gap-sentences for Abstractive Summarization", Proceedings of the 37th International Conference on Machine Learning, Online, PMLR 119, 2020, pp. 11328-11339.

* cited by examiner

110

Determine a set of pseudo tokens using first unlabeled training data

120

Train a first speech processing model using the set of pseudo tokens and second unlabeled training data

130

Train a second speech processing model using labeled training data

140

Deploy the second speech processing model to production

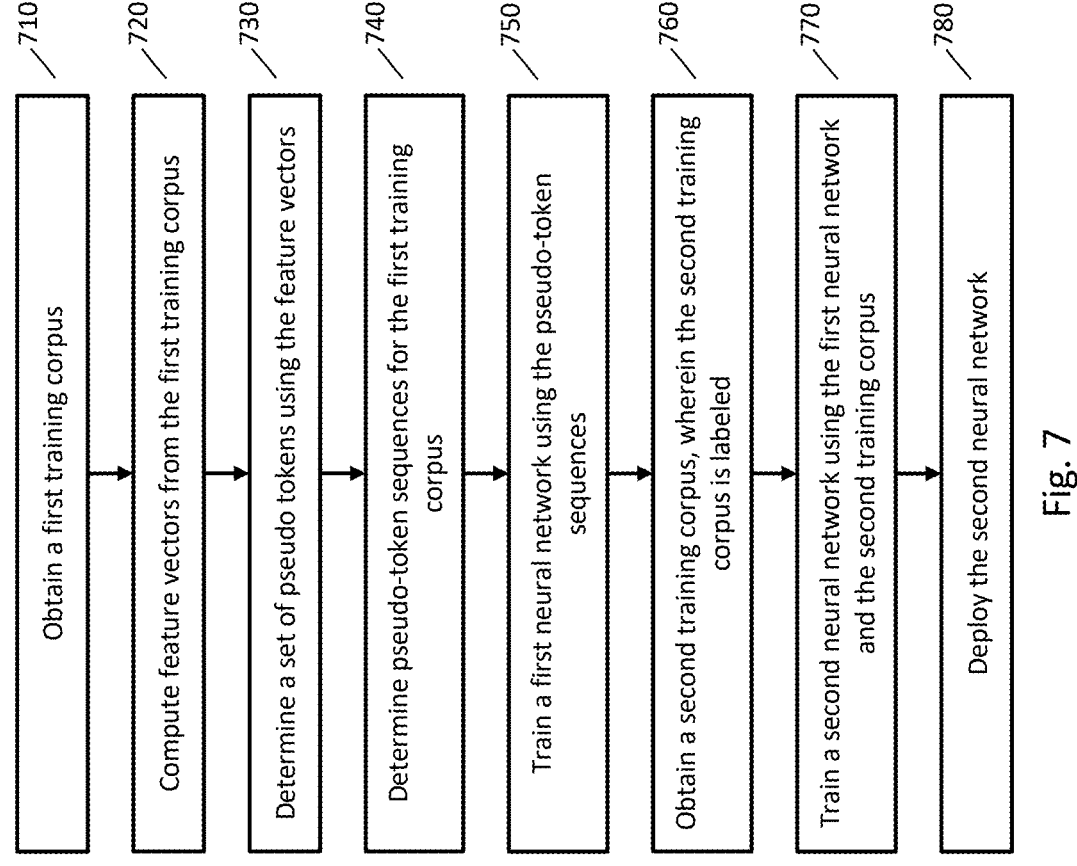

710 Obtain a first training corpus

720 Compute feature vectors from the first training corpus

730 Determine a set of pseudo tokens using the feature vectors

740 Determine pseudo-token sequences for the first training corpus

750 Train a first neural network using the pseudo-token sequences

760 Obtain a second training corpus, wherein the second training corpus is labeled 770 Train a second neural network using the first neural network and the second training corpus 780 Deploy the second neural network

Fig. 7

TRAINING SPEECH PROCESSING MODELS USING PSEUDO TOKENS

CROSS-REFERENCE TO RELATED APPLICATION

This application claims the benefit of priority to U.S. Provisional Patent Application No. 63/303,821, filed 27 Jan. 2022 entitled "WAV2SEQ: PRE-TRAINING SPEECH-TO-TEXT ENCODER-DECODER MODELS USING PSEUDO LANGUAGES."

The foregoing application is incorporated herein by reference in its entirety for all purposes.

BACKGROUND

A speech processing model may be trained using labeled training data. For example, when training a speech recognition model, the labeled training data may be transcribed speech. The training procedure may process the audio of speech and the text corresponding to the speech, and learn how to transform speech audio to text.

One difficulty in training speech processing models using labeled training data is the cost to obtain the labeled training data. Training a speech processing model may require large amounts of data, and transcribing large amounts of speech (e.g., by humans) may be an expensive undertaking.

Where speech processing models may be trained using unlabeled data in addition to labeled data, the costs of training the speech processing model may be decreased and/or the quality of the speech processing model may be improved.

SUMMARY

In some aspects, the techniques described herein relate to a computer-implemented method, including: obtaining a first training corpus of first training samples; computing feature vectors from the first training samples; determining a set of pseudo tokens from the feature vectors by: clustering at least a portion of the feature vectors into a plurality of clusters, assigning a cluster-token to each cluster of the plurality of clusters, determining a plurality of cluster-token sequences using the plurality of clusters, and determining the set of pseudo tokens by performing token compression on the plurality of cluster-token sequences; determining a plurality of pseudo-token sequences using the feature vectors and the set of pseudo tokens; training a first neural network using the first training samples and the plurality of pseudo-token sequences; obtaining a second training corpus of second training samples, wherein the second training corpus is labeled; training a second neural network using the second training corpus, wherein at least a portion of the second neural network is initialized using the first neural network; and deploying the second neural network to a production system.

In some aspects, the techniques described herein relate to a computer-implemented method, wherein clustering the feature vectors includes using k-means clustering.

In some aspects, the techniques described herein relate to a computer-implemented method, including performing a deduplication operation on the plurality of cluster-token sequences.

In some aspects, the techniques described herein relate to a computer-implemented method, wherein performing token compression includes performing token compression using byte-pair encoding.

In some aspects, the techniques described herein relate to a computer-implemented method, wherein performing token compression includes performing token compression using subword regularization.

In some aspects, the techniques described herein relate to a computer-implemented method, wherein the first neural network includes a first encoder and a first decoder.

In some aspects, the techniques described herein relate to a computer-implemented method, wherein the first neural network includes a transducer neural network.

In some aspects, the techniques described herein relate to a computer-implemented method, wherein the transducer neural network includes a joint network.

In some aspects, the techniques described herein relate to a system, including at least one server computer including at least one processor and at least one memory, the at least one server computer configured to: obtain a first training corpus of first training samples; compute feature vectors from the first training samples; determine a set of pseudo tokens from the feature vectors by: clustering at least a portion of the feature vectors into a plurality of clusters, assigning a cluster-token to each cluster of the plurality of clusters, determining a plurality of cluster-token sequences using the plurality of clusters, and determining the set of pseudo tokens by performing token compression on the plurality of cluster-token sequences; determine a plurality of pseudo-token sequences using the feature vectors and the set of pseudo tokens; train a first neural network using the first training samples and the plurality of pseudo-token sequences; obtain a second training corpus of second training samples, wherein the second training corpus is labeled; train a second neural network using the second training corpus, wherein at least a portion of the second neural network is initialized using the first neural network; and deploy the second neural network to a production system.

In some aspects, the techniques described herein relate to a system, wherein the first neural network includes a first encoder and a first decoder.

In some aspects, the techniques described herein relate to a system, wherein: a second encoder of the second neural network is initialized using the first encoder of the first neural network; and a second decoder of the second neural network is initialized using the first decoder of the first neural network.

In some aspects, the techniques described herein relate to a system, wherein the first encoder includes a transformer encoder and the first decoder includes a transformer decoder.

In some aspects, the techniques described herein relate to a system, wherein the first encoder includes a recurrent neural network.

In some aspects, the techniques described herein relate to a system, wherein the first encoder includes a convolutional neural network.

In some aspects, the techniques described herein relate to a system, wherein the at least one server computer is configured to compute the feature vectors by performing average pooling.

In some aspects, the techniques described herein relate to one or more non-transitory, computer-readable media including computer-executable instructions that, when executed, cause at least one processor to perform actions including: obtaining a first training corpus of first training samples; computing feature vectors from the first training samples; determining a set of pseudo tokens from the feature vectors by: clustering at least a portion of the feature vectors into a plurality of clusters, assigning a cluster-token to each cluster of the plurality of clusters, determining a plurality of cluster-token sequences using the plurality of clusters, and determining the set of pseudo tokens by performing token compression on the plurality of cluster-token sequences; determining a plurality of pseudo-token sequences using the feature vectors and the set of pseudo tokens; training a first neural network using the first training samples and the plurality of pseudo-token sequences; obtaining a second training corpus of second training samples, wherein the second training corpus is labeled; training a second neural network using the second training corpus, wherein at least a portion of the second neural network is initialized using the first neural network; and deploying the second neural network to a production system.

In some aspects, the techniques described herein relate to one or more non-transitory, computer-readable media, wherein the first neural network includes a first encoder and a first decoder.

In some aspects, the techniques described herein relate to one or more non-transitory, computer-readable media, wherein the second training corpus is labeled with text corresponding to the second training samples and the production system performs speech recognition.

In some aspects, the techniques described herein relate to one or more non-transitory, computer-readable media, wherein training the first neural network includes optimizing a connectionist temporal classification objective function.

In some aspects, the techniques described herein relate to one or more non-transitory, computer-readable media, wherein a portion of the second neural network is initialized with random values.

BRIEF DESCRIPTION OF THE FIGURES

The invention and the following detailed description of certain embodiments thereof may be understood by reference to the following figures:

FIG. 7 is a flowchart of an example method for training a speech processing model.

DETAILED DESCRIPTION

Speech processing models may be used for a variety of applications. For example, speech may be processed to transcribe the speech to text (i.e., speech recognition), generate a text summary of the speech, identify named entities in the speech without transcribing the speech, translate the speech to text of a different language without transcribing the speech to the language with which it was spoken (e.g., translate English audio to French text without first transcribing the audio to English text).

The training of a speech processing model may require a large amount of training data because a speech processing model needs to learn to understand the speech of people with different sounding voices (e.g., men, women, adults, children, accents, etc.). Some existing techniques for training speech processing models use only labeled training data. A corpus of training data may be obtained with training samples or utterances where each training sample includes a label (e.g., for speech recognition, the label may be a transcription of the speech). Obtaining a large amount of labeled training data may be time consuming and may be expensive.

To reduce the costs of training speech processing models, unlabeled training data may be used in addition to labeled training data. The use of unlabeled training data may be referred to as self-supervised learning.

The techniques described herein use unlabeled training data for computing pseudo tokens that may be used to more efficiently train speech processing models with smaller amounts of labeled training data. For clarity of presentation, an example of a speech processing model that performs speech recognition is described below, but the techniques described herein may be used for any appropriate speech processing model.

In language processing, tokens may be used to represent text. Tokens may take a variety of forms. For example, tokens may correspond to characters, words, or parts of words. As used herein, pseudo tokens are tokens that may be used to represent text where the text portion represented by a pseudo token is determined from audio data (which may not be labeled). For example, suppose we have a pseudo token designated as X. Each time that the pseudo token X is used, it represents the same portion of text so X in one training sample represents the same portion of text as X in another training sample. However, since the pseudo tokens are determined from the audio data, they may represent portions of text that are different from typical tokens (e.g., characters, words, or conventional parts of words).

Figure 1:
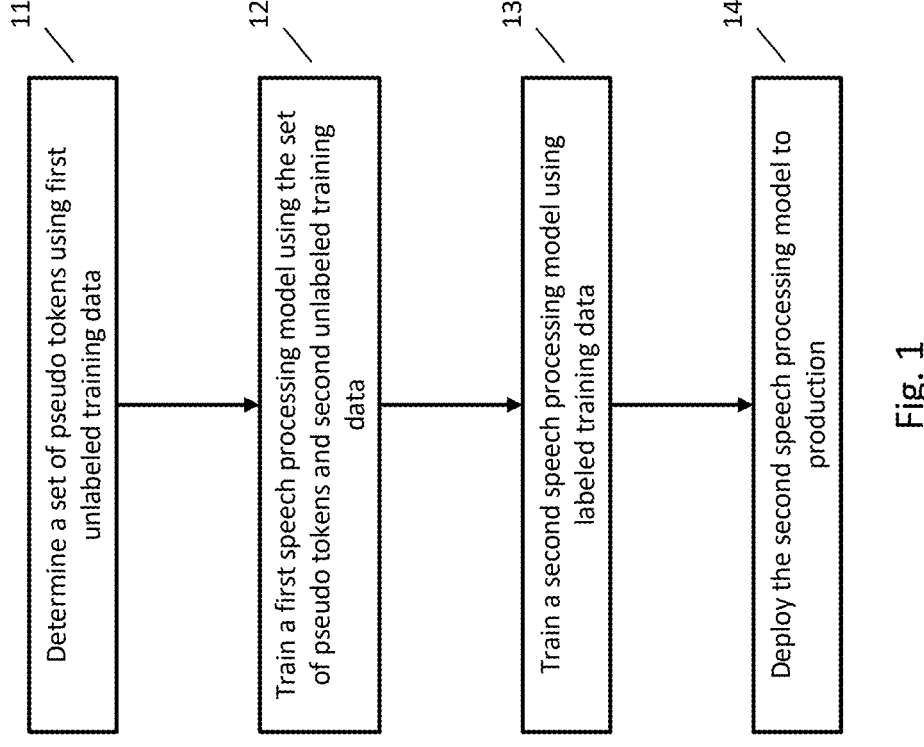
FIG. 1 is a flowchart of an example method for training a speech processing model using pseudo tokens.

FIG. 1 is a flowchart of an example method for training a speech processing model using pseudo tokens.

At step 110, a set of pseudo tokens is determined using first unlabeled training data. The process of determining the set of pseudo tokens is described in greater detail below, but may include one or more of the following operations: computing sequences of feature vectors from audio training samples, clustering the feature vectors, representing the training samples as a sequence of cluster tokens where each cluster token corresponds to a cluster of feature vectors, deduplicating the cluster token sequences by replacing sequences of the same cluster token with a single cluster token representing the sequence, and performing token compression on the sequences of deduplicated cluster token sequences to generate the set of pseudo tokens. In some implementations, the number of clusters may be around 25 and the number of pseudo tokens may be around 1000.

The set of pseudo tokens may be used to represent text of the training samples without knowing the text of the training samples. Once the pseudo tokens are determined, the process of step 110 may be used to represent any training sample as a sequence of pseudo tokens. A training sample may be processed to determine a sequence of feature vectors, the feature vectors may be replaced with a sequence of cluster tokens, the sequence of cluster tokens may be deduplicated to replace sequences of the same cluster token with a single cluster token, and token compression may be performed to represent the training sample using the set of pseudo tokens.

At step 120, a first speech processing model is trained using the set of pseudo tokens and second unlabeled training data. This step may be referred to as a pre-training step. The second unlabeled training data may be the same as the first unlabeled training data or may be different. In some implementations, the first unlabeled data may be a subset of the second unlabeled training data.

Training samples of the second unlabeled training data may be represented as sequences of pseudo tokens using techniques similar to those described above at step 110. A training process may then be used to process the unlabeled training data and pseudo tokens to train the first speech processing model. The first speech processing model is trained to receive audio as input and determine a sequence of pseudo tokens to represent the audio. Any appropriate training process and model architecture may be used, such as any of the training processes and model architectures described herein.

The training process of step 120 creates a model that is able to generate sequences of pseudo tokens from audio, but since the pseudo tokens were created from unlabeled data, the pseudo tokens may not be directly useful for some speech processing applications. Accordingly, the first speech processing model understands the structure of speech (in that it is able to generate pseudo tokens), but it may be desired to adapt the first speech processing model to generate other outputs, such as a transcription of speech. Labeled training data may be used to adapt the first speech processing model to generate other outputs.

At step 130, a second speech processing model is training using labeled training data. This step may be referred to as a fine-tuning step. At least a portion of the second speech processing model may be initialized using the first speech processing model trained at step 120. For example, the initial values of one or more layers of the second speech processing model may be initialized using values taken from the first speech processing model. Other values of the second speech processing model may be initialized using other techniques (e.g., using random values). At step 140, the second speech processing model may be deployed to production.

Initializing the second speech processing model with the values from the first speech processing model allows the second speech processing model to be trained with a smaller amount of labeled training data than if the second speech processing model was initialized using conventional initialization techniques (e.g., random initialization). The adaptation of the first speech processing model to the second speech processing model requires less labeled training data than training the second speech processing model from the beginning without the use of another model.

Since the training of the second speech processing model requires less labeled training data, it may be trained in less time and at lower cost than a model that requires larger amounts of labeled training data. Furthermore, with sufficient unlabeled training data, the performance of the second speech processing model (e.g., accuracy) may have higher performance than a model that is trained with only labeled training data.

Figures 2, 3:
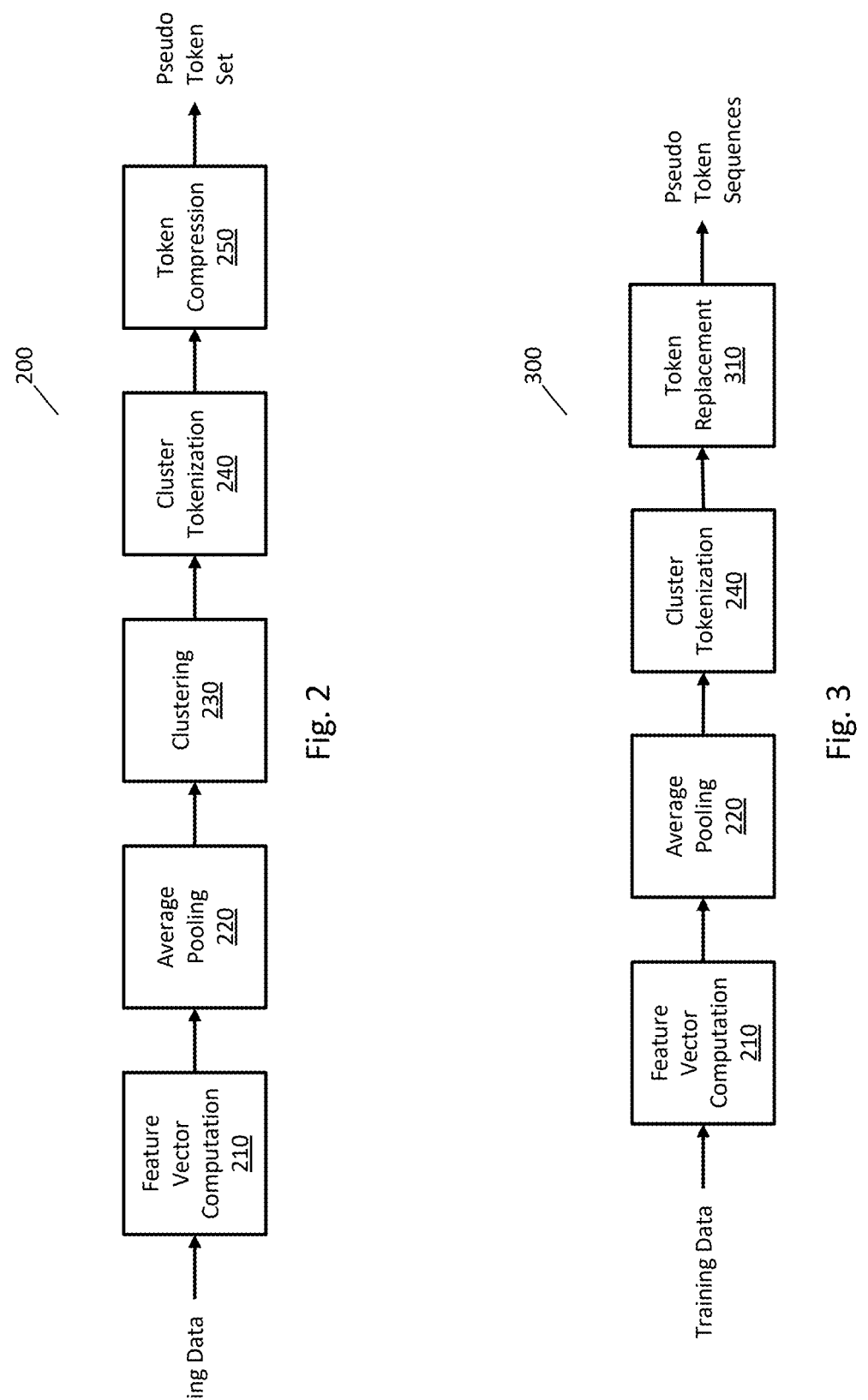
FIG. 2 is an example system for determining a set of pseudo tokens from training data.
FIG. 3 is an example system for determining sequences of pseudo tokens for training data samples.

FIG. 2 is an example system 200 for determining a set of pseudo tokens from training data. System 200 may be used to process a corpus of speech training data, such as a corpus of unlabeled speech training data.

In FIG. 2, feature vector computation component 210 may process training samples (e.g., audio data or utterances of the training data) to represent each training sample as a sequence of feature vectors. Any appropriate feature vector computation may be used such Mel-frequency cepstral coefficients, Wav2Vec features, or HuBERT features.

In some implementations, average pooling component 220 may process the feature vectors from feature vector computation component 210 to output a sequence of average-pooled feature vectors for each training sample. Any appropriate average pooling techniques may be used. In some implementations, average pooling component 220 may be omitted.

Clustering component 230 may perform clustering on feature vectors of the training data. Clustering component 230 may process either the feature vectors of feature vector computation component 210 or the average-pooled feature vectors of average pooling component 220. Any appropriate clustering techniques may be used, such as k-means clustering. Any appropriate number of clusters may be used, such as 25 clusters.

Cluster tokenization component 240 generates a sequence of cluster tokens for each training sample. Each training sample will have a sequence of feature vectors as computed by feature vector computation component 210 and optionally average pooling component 220. For each feature vector, a cluster may be selected, such as by selecting the cluster whose centroid is closest to the feature vector. The cluster tokens may be represented using any appropriate techniques, such as using an index of the cluster to represent the corresponding token (e.g., a token "c1" for a first cluster). A training sample may then be represented by a sequence of cluster tokens.

In some implementations, cluster tokenization component 240 may also perform a deduplication operation. Consecutive feature vectors may belong to the same came cluster and have the same cluster token. In some implementations, it may be desired to replace consecutive instances of the same cluster token with a single instance of that cluster token. For example, the cluster token sequence "c12 c7 c7 c7 c7 c3 c3 c3 c3" may be deduplicated to generate the cluster token sequence of "c12 c7 c3."

Token compression component 250 may perform token compression on the sequences of cluster tokens for the training samples to generate the set of pseudo tokens. As used herein, token compression includes any operations to replace two or more consecutive cluster tokens with a single compressed token to reduce the overall token lengths of the training samples. For example, where the cluster token sequence "c12 c7" appears frequently in the training samples, this pair of cluster tokens may be replaced with a single compressed token (e.g., "c12c7") to reduce the overall token lengths of the training samples.

In some implementations, token compression may be performed iteratively by identifying the most frequent consecutive tokens. The counts of pairs of consecutive tokens may be determined (e.g., that "c1 c2" occurs 121 in the training samples). A new compressed token may be created corresponding to the pair of subsequent tokens with the largest count (e.g., a new pseudo token "c1c2" may be created). Accordingly, the number of tokens is increased, but the overall token length of the training samples is decreased. This process may be repeated until a suitable stopping criterion is reached (e.g., a limit on the total number of tokens). Any appropriate token compression techniques may be used, such as byte-pair encoding, unigram language models, subword regularization, or SentencePiece (see e.g., Philip Gage, 1994, "A new algorithm for data compression," C Users J. 12(2): 23-38; Taku Kudo, 2018, "Subword Regularization: Improving Neural Network Translation Models with Multiple Subword Candidates," Proceedings of the 56th Annual Meeting of the Association for Computational Linguistics (Volume 1: Long Papers); Taku Kudo and John Richardson, 2018, "SentencePiece: A simple and language independent subword tokenizer and detokenizer for Neural Text Processing," Proceedings of the 2018 Conference on Empirical Methods in Natural Language Processing: System Demonstrations).

The set of pseudo tokens may correspond to the set of compressed tokens at the completion of the compression process. In some implementations, the compressed tokens may be relabeled, such as by relabeling a compressed token "c1c2" as pseudo token "p1." The output of token compression component 250 is a set of pseudo tokens that may be used for training speech processing models.

FIG. 3 is an example system 300 for determining sequences of pseudo tokens for training data samples. System 300 may be used to process a corpus of speech training data, such as a corpus of unlabeled speech training data. The training data processed by system 300 may be different from the training data processed by system 200. In some implementations, the training data processed by system 200 may be a subset of the training data processed by system 300.

In FIG. 3, feature vector computation component 210, average pooling component 220, and cluster tokenization component 240 may perform the same operations as in FIG. 2. A training sample is processed by feature vector computation component 210 and optionally by average pooling component 220 to generate a sequence of feature vectors. Cluster tokenization component 240 may then reuse the clusters determined by system 200 to generate a sequence of cluster tokens for each training sample. As above, cluster tokenization component 240 may perform a deduplication operation.

Token replacement component 310 may then create a sequence of pseudo tokens for each training sample from the sequence of cluster tokens for the training sample. Token replacement component 310 may perform this replacement using any appropriate techniques. In some implementations, token compression component 250 may generate a mapping of sequences of one or more cluster tokens to pseudo tokens, and token replacement component 310 may use this mapping to convert the cluster token sequences to pseudo token sequences.

The pseudo-token sequences of the training data may then be used to train a mathematical model for speech processing.

Figures 4A, 4B:
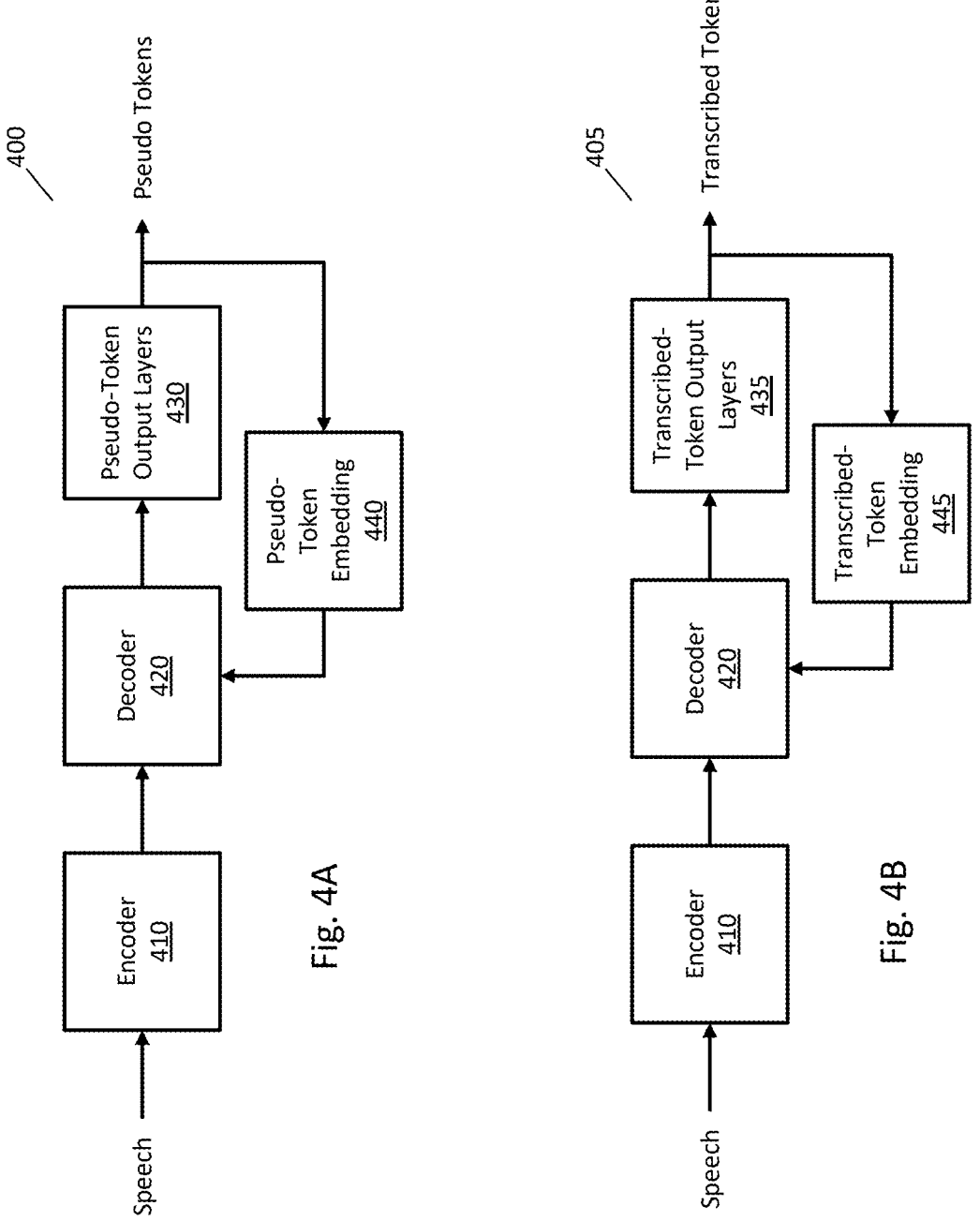
FIG. 4A is an example system for training an encoder-decoder neural network for speech processing using pseudo tokens.
FIG. 4B is an example system for training an encoder-decoder neural network for speech processing using labeled training data.

FIG. 4A is an example system 400 for training an encoder-decoder neural network for speech processing using pseudo tokens. The training process of system 400 may be referred to as pre-training a neural network using self-supervised learning.

System 400 processes a corpus of training data that includes (a) training samples of speech and (b) sequences of pseudo tokens corresponding to the speech. The pseudo token sequences may be generated using any appropriate techniques, such as described above for system 300.

In system 400, the training process may include a forward pass. Speech of a training sample is processed by encoder 410 and decoder 420. Encoder 410 and decoder 420 may include any encoder and decoder neural networks used for speech processing, including but not limited to recurrent neural networks, convolutional neural networks, transformer neural networks, transducer neural networks, and multilayer perceptrons. In some implementations, encoder 410 may process a training sample to generate a sequence of feature vectors, and decoder 420 may process the sequence of feature vectors to generate outputs that may be used to iteratively determine an output sequence of tokens corresponding to the speech.

Pseudo-token output layers 430 may process the output of decoder 420 to determine a next pseudo token. For example, for a first iteration, pseudo-token output layers 430 may determine the first pseudo token corresponding to the training sample, for a second iteration, pseudo-token output layers 430 may determine the second pseudo token corresponding to the training sample, and so forth. Pseudo-token output layers 430 may be implemented using any appropriate techniques, such as one or more linear layers and a softmax layer.

Pseudo-token embedding component 440 may process the most recently generated pseudo token and generate an embedding vector corresponding to the pseudo token. This embedding vector may be used by decoder 420 when generating subsequent tokens.

Accordingly, decoder 420, pseudo-token output layers 430, and pseudo-token embedding component 440 may iteratively generate a sequence of pseudo tokens corresponding to a training sample. For a first iteration, decoder 420 may process a start of utterance token to indicate that the first token to be generated is the first token of a training sample. In subsequent iterations, decoder 420 may process the previously generated tokens so that the next generated token is determined using the context of the previous tokens. The process may repeat until an end-of-utterance token is generated or any other appropriate stopping criteria.

The sequence of pseudo tokens generated by the forward pass may then be compared with the previously-generated sequence of pseudo tokens to generate an error value. For example, where the two sequences are similar, the error may be low, and where the two sequences have many differences, the error may be higher. This error value may then be used in a backward pass to update the parameters of system 400. Any appropriate techniques may be used, such as stochastic gradient descent and mini-batch processing.

The training process may iterate over the training data to perform forward and backward passes to update the parameters of system 400. The training process may continue until a desired stopping criterion has been reached.

The result of system 400 is a first neural network that may process audio data to generate a sequence of pseudo tokens corresponding to the audio data. Because system 400 does not require labeled training data (the pseudo token sequences are generated automatically as described herein), a large amount of training data may be used for the training.

FIG. 4B is an example system 405 for training an encoder-decoder neural network for speech processing using labeled training data. The training process of system 405 may be referred to as fine-tuning a neural network. For example, for a speech recognition application, each training sample of the training data may be associated with a sequence of transcribed tokens corresponding to a transcription of the training sample. The transcribed tokens may correspond to characters, word, or portions of words of the text of the speech.

System 405 may be initialized using the first neural network trained by system 400. In system 405, encoder 410 and decoder 420 may have the same architecture as system 400. Accordingly, in system 405, some or all of the initial parameters of encoder 410 and decoder 420 may be set to the final parameters of the first neural network trained by system 400.

Portions of system 405 may be different from system 400. For example, pseudo-token output layers 430 has been replaced with transcribed-token output layers 435 and pseudo-token embedding component 440 has been replaced with transcribed-token embedding component 445. These changes account for the differences between processing pseudo tokens in system 400 and transcribed tokens in system 405. Transcribed-token output layers 435 and transcribed-token embedding component 445 may be initialized using any appropriate techniques, such as random initialization.

The training process for system 405 may proceed as described above except that the output of system 405 is a sequence of transcribed tokens instead of a sequence of pseudo tokens.

The amount of labeled training data for training system 405 may be less than the amount of unlabeled training data used for training system 400 because of the cost to obtain labeled training data. The disadvantages of having less training data, however, may be overcome by the initialization of the parameters of encoder 410 and decoder 420. By initializing these components to good starting values (as opposed to random initialization), less labeled training data is needed to optimize these values and high quality models may be obtained with less labeled training data.

Any appropriate encoder and decoder architectures may be used in FIGS. 4A and 4B. Now described are example encoder and decoder architectures that may be used to train speech processing models.

Figure 5:
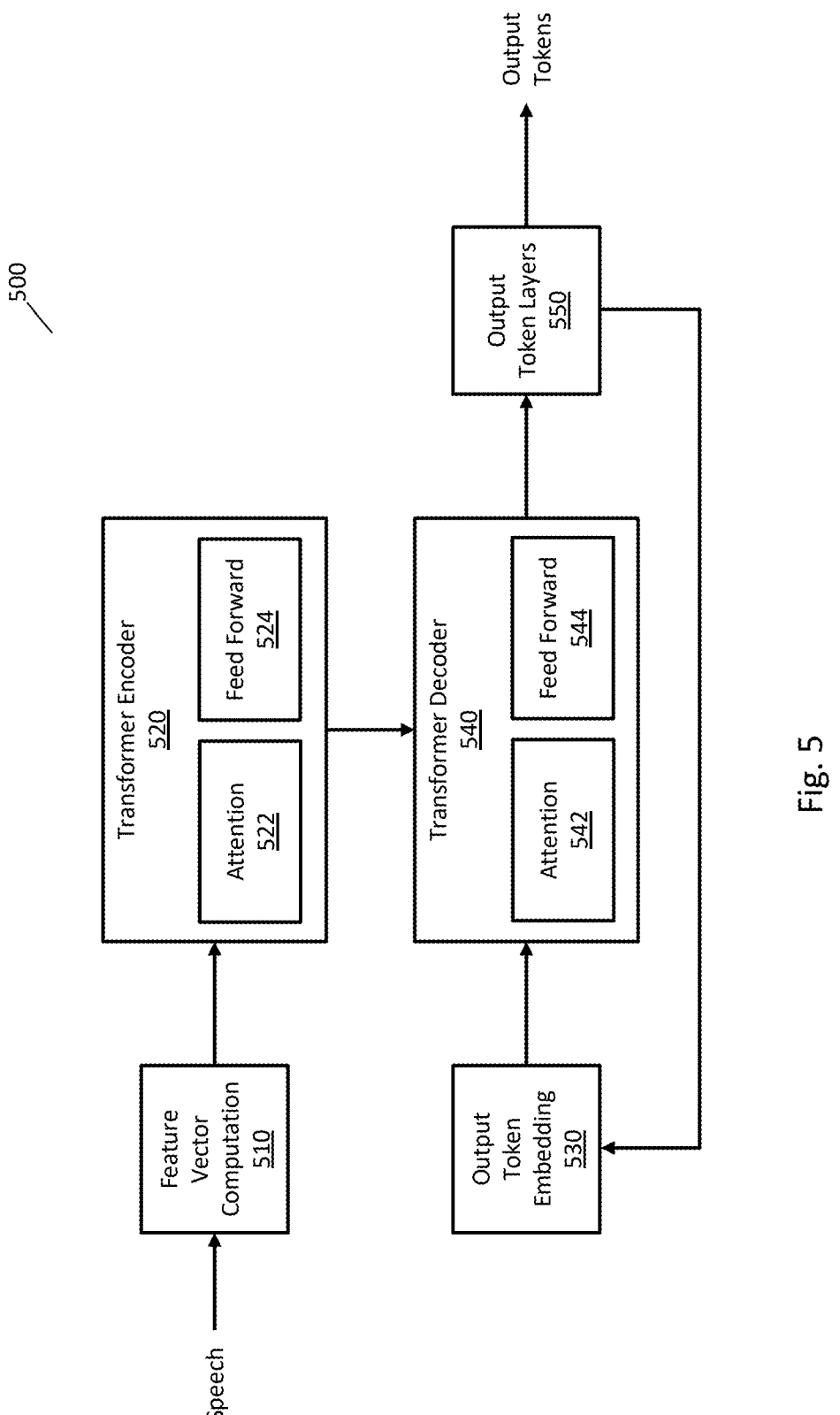
FIG. 5 is an example system for training a transformer encoder-decoder neural network for speech processing.

FIG. 5 is an example system 500 for training a transformer encoder-decoder neural network for speech processing. System 500 may be used for pre-training a model with pseudo tokens and/or fine-tuning a model with transcribed tokens.

In FIG. 5, speech audio is processed by feature vector computation component 510 to generate a sequence of feature vectors representing the speech audio. Any appropriate feature vectors may be computed, such as any of the feature vectors described herein.

Transformer encoder 520 processes the feature vectors computed by feature vector computation component 510 to generate an encoded representation of the speech audio to be processed by transformer decoder 540. Transformer encoder 520 may implement any appropriate techniques for a transformer encoder, such as processing the feature vectors with one or more transformer encoder blocks. A transformer encoder block may include, for example, an attention layer 522 and a feed-forward layer 524. In some implementations, transformer encoder 520 may be optimized using a connectionist temporal classification objective function.

Transformer decoder 540 may process the output of transformer encoder 520 to iteratively generate a sequence of output tokens. Any appropriate output tokens may be generated, such as pseudo tokens or transcribed tokens. Transformer decoder 540 may implement any appropriate techniques for a transformer decoder, such as processing the inputs with one or more transformer decoder blocks. A transformer decoder block may include, for example, an attention layer 542 and a feed-forward layer 544.

Output token layers 550 may process the output of transformer decoder 540 to iteratively determine the next output token, as described above. Output token layers 550 may be implemented using any appropriate techniques, such as one or more linear layers and a softmax layer.

Output token embedding component 530 may process the most recently generated output token and generate an embedding vector corresponding to the output token. This embedding vector may be used by transformer decoder 540 when generating subsequent output tokens.

Figure 6:
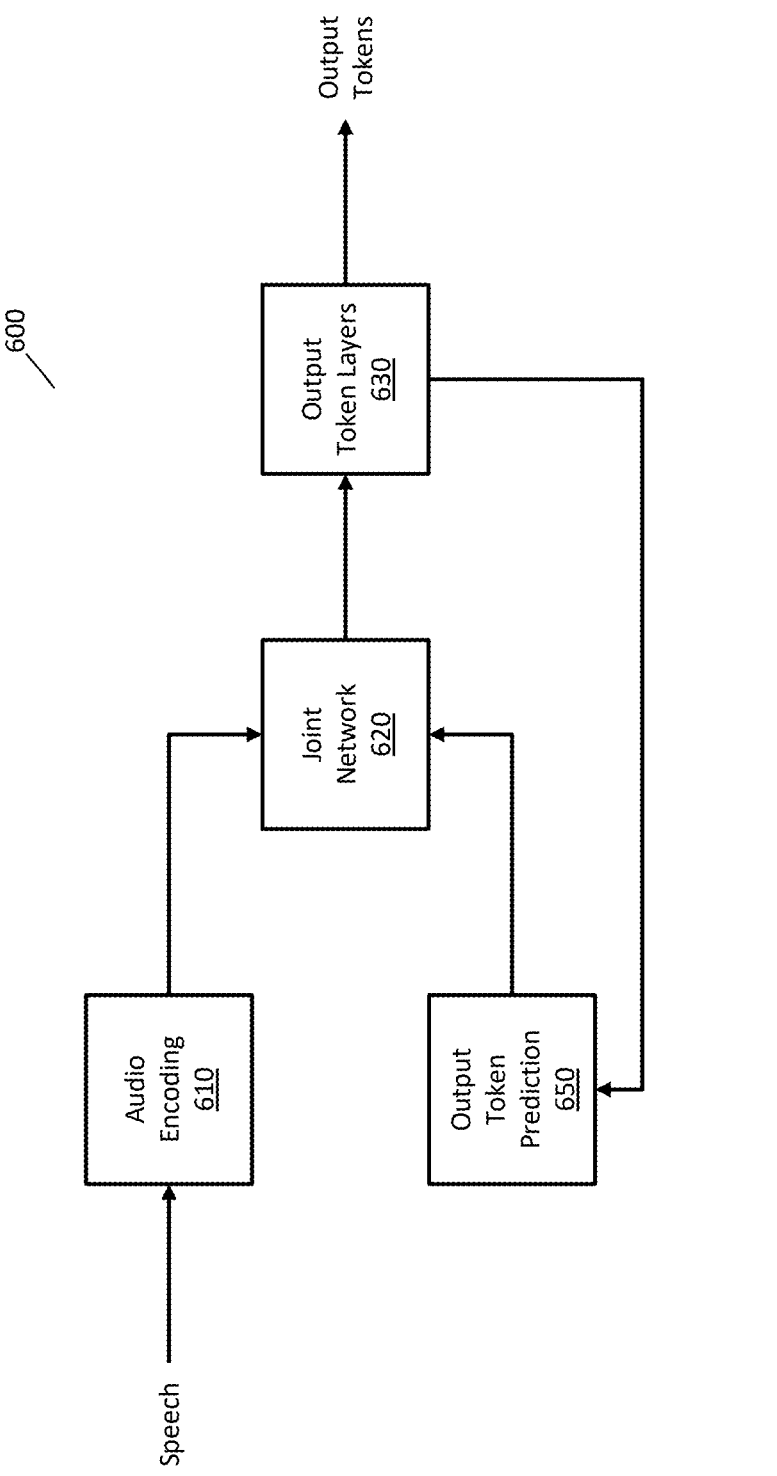
FIG. 6 is an example system for training a transducer neural network for speech processing.

FIG. 6 is an example system 600 for training a transducer neural network for speech processing. System 600 may be used for pre-training a model with pseudo tokens and/or fine-tuning a model with transcribed tokens.

In FIG. 6, audio encoding component 610 processes the speech audio to generate a sequence of audio-encoding vectors representing the speech audio that may be used to determine output tokens from the speech audio. Audio encoding component 610 may perform any appropriate operations, including but not limited to computing feature vectors from the speech audio and encoding operations, such as the operations of any of the encoders described herein. In some implementations, audio encoding component 610 may perform operations similar to an acoustic model. Audio encoding component 610 may be implemented using any appropriate neural networks, such as a convolutional neural network, a recurrent neural network, a transformer neural network, or a multi-layer perceptron.

Output token prediction component 650 processes one or more previous output tokens to compute a vector that may be used to determine the next output token. Output token prediction component 650 may perform any appropriate operations, including but not limited to computing an output token embedding and decoding operations, such as the operations of any of the decoders described herein. In some implementations, output token prediction component 650 may perform operations similar to a language model. Output token prediction component 650 may be implemented using any appropriate neural networks, such as a convolutional neural network, a recurrent neural network, a transformer neural network, or a multi-layer perceptron.

Joint network 620 processes the output of audio encoding component 610 and output token prediction component 650 to compute a vector that may be used to determine the next output token that takes into account both the speech audio and the previous output tokens. The number of audio-encoding vectors generated from the input speech may be different from the number of output tokens (e.g., the number of audio-encoding vectors may be larger than the number of output tokens). Accordingly, when processing a next audio-encoding vector, joint network 620 may process the audio-encoding vector without outputting a next output token. Additionally, joint network 620 may output more than one output token for a single audio-encoding vector. Joint network 620 may be implemented using any appropriate techniques, such as using a beam search, a forward-backward algorithm, and/or a neural network, such as any of the neural networks described herein.

Output token layers component 630 processes the vector computed by joint network 620 to determine a next output token. This output token is also processed by output token prediction component 650 to be used in determining subsequent output tokens. Output token layers component 630 may be implemented using any appropriate techniques, such as one or more linear layers and a softmax layer.

FIG. 7 is a flowchart of an example method for training a speech processing model.

At step 710, a first training corpus is obtained. The first training corpus may include any appropriate training samples, such as recordings of speech stored as files of audio data. The first training corpus may not have any labels, such has not having transcriptions corresponding to speech of the training samples.

At step 720, feature vectors are computed from the training corpus. For example, a sequence of feature vectors may be computed for each training sample of the training corpus. Any appropriate feature vectors may be computed, such as any of the feature vectors described herein. In some implementations, the feature vectors may be computed using average pooling as described herein.

At step 730, a set of pseudo tokens is determined from the feature vectors. The set of pseudo tokens may be determined using any of the techniques described herein, and the set of pseudo tokens may be determined using only a portion of the first training corpus. Example implementations for determining a set of pseudo tokens are described in FIG. 8.

At step 740, pseudo-token sequences are determined for the first training corpus. The pseudo-token sequences may be determined using any of the techniques described herein. For example, a pseudo-token sequence may be determined from a sequence of feature vectors for a training sample by (i) determining a sequence of cluster tokens by finding a closest cluster for each feature vector, (ii) deduplicating the sequence of cluster tokens by replacing sequences of the same cluster token with a single cluster token, and (iii) converting the sequence of deduplicated cluster tokens to a sequence of pseudo tokens according to a token compression performed in determining the set of pseudo tokens. In some implementations, a sequence of pseudo tokens may be determined for each training sample of the first training corpus.

At step 750, a first neural network is trained using the pseudo-token sequences. The first neural network may have any of the neural network architectures described herein. For example, the first neural network may have an encoder-decoder architecture. The first neural network may be implemented, for example, using any appropriate combination of convolutional neural networks, recurrent neural networks, transformer neural networks, transducer neural networks, or multi-layer perceptrons.

At step 760, a second training corpus is obtained where the second training corpus is labeled. The second training corpus may include any appropriate training samples, such as recordings of speech stored as files of audio data. The second training corpus may include any appropriate labels, such as a transcription of speech in the training sample, a text summary of the speech, a translation of the speech in the training sample in a different language (e.g., a French text corresponding to English speech in the training sample), or one or more named entities present in the speech of the training sample.

At step 770, a second neural network is trained using the first neural network and the second training corpus. At least a portion of the second neural network may by initialized using the first neural network. For example, one or more layers of the first neural network may be reused or copied to initialize the second neural network (e.g., parameters of the first neural network may be the initial value of parameters of the second neural network). The second neural network may have any of the neural network architectures described herein, such as any of the architectures described above for the first neural network.

At step 780, the second neural network may be deployed to a production system for use. For example, where the second neural network performs automated speech recognition, it may be used in a production system to convert audio to text.

Figure 8:
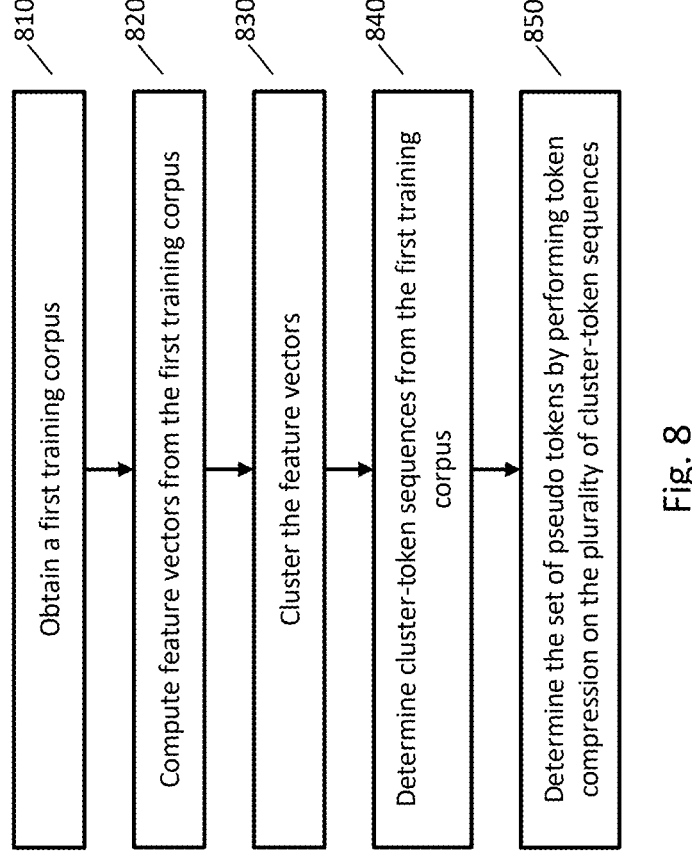
FIG. 8 is a flowchart of an example method for determining a set of pseudo tokens.

FIG. 8 is a flowchart of an example method for determining a set of pseudo tokens.

At step 810, a first training corpus is obtained. At step 820, feature vectors are computed from the training corpus. These steps may be performed using any of the techniques described herein, such as at step 710 and step 720 of FIG. 7.

At step 830, the feature vectors are clustered. Any appropriate clustering techniques may be used, such as k-means clustering. The number of clusters may be set in advance as a parameter or determined from the training corpus. Each cluster may have a mean or centroid and a variance with dimensions corresponding to the dimensions of the feature vectors. A distance between a feature vector and a cluster may be determined using the centroid and/or variance of the cluster. A cluster token may be assigned to each cluster, such as any of the tokens described herein.

At step 840, cluster-token sequences are determined using the clusters and the first training corpus. As used herein, a cluster token is a symbol that represents a cluster. For example, where there are 10 clusters, the corresponding cluster tokens may be $c1, c2, \ldots, c10$. For a training sample that is a sequence of feature vectors, a cluster-token sequence may be created by replacing each feature vector with its corresponding cluster token (the cluster token corresponding to the cluster that the feature vector was assigned to at step 830). Cluster token sequences may be determined for one or more training samples of the first training corpus. In some implementations, a cluster-token sequence may be determined for each training sample of the training corpus.

At step 850, token compression is performed on the cluster-token sequences. Any appropriate token compression techniques may be applied, such as any of the token compression techniques described herein. In some implementations, token compression may be performed using byte-pair encoding. The number of compressed tokens may be set in advance as a parameter or determined from the cluster-token sequences. The token compression creates sequences of compressed tokens from the sequences of cluster tokens. In some implementations, the set of pseudo tokens may correspond to all of the compressed tokens that appear in the compresses-token sequences. In some implementations, a new label may be applied to the pseudo tokens. For example, a compressed token may be represented as "c2c7" (corresponding to sequences of cluster tokens "c2" and "c7") and this compressed token may be relabeled as pseudo token "p1".

The set of pseudo tokens may then be used for any appropriate application. In some instances, the set of pseudo tokens may be used to train speech processing models, such as described in FIG. 7.

Figure 9:
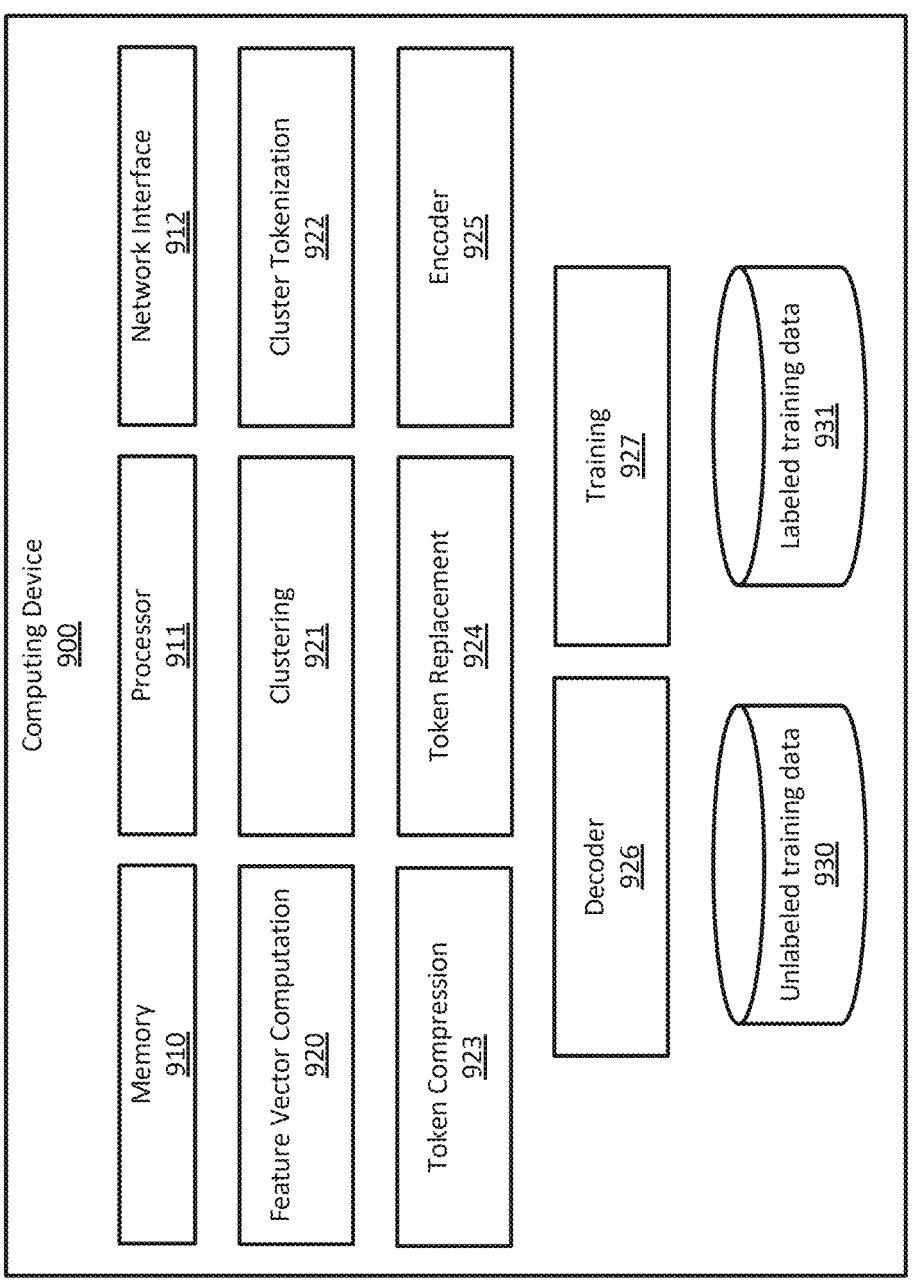
FIG. 9 illustrates components of one implementation of a computing device for implementing any of the techniques described herein.

FIG. 9 illustrates components of one implementation of a computing device 900 for implementing any of the techniques described herein. In FIG. 9, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 900 may include any components typical of a computing device, such as volatile or nonvolatile memory 910, one or more processors 911, and one or more network interfaces 912. Computing device 900 may also include any input and output components, such as displays, keyboards, and touch screens. Computing device 900 may also include a variety of components or modules providing specific functionality, and these components or modules may be implemented in software, hardware, or a combination thereof. Computing device 900 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 900 may have a feature vector computation component 920 that may compute feature vectors from audio data using any of the techniques described herein. Computing device 900 may have a clustering component 921 that may cluster feature vectors using any of the techniques described herein. Computing device 900 may have a cluster tokenization component 922 that may determine sequences of cluster tokens for training samples using any of the techniques described herein. Computing device 900 may have a token compression component 923 that may compress token sequences using any of the techniques described herein. Computing device 900 may have a token replacement component 924 that may determine pseudo-token sequences for training samples using any of the techniques described herein. Computing device 900 may have an encoder component 925 that may encode audio data or feature vectors using any of the techniques described herein. Computing device 900 may have a decoder component 926 that may decode encoded speech using any of the techniques described herein. Computing device 900 may have a training component 927 that may train a speech processing model from a training corpus using any of the techniques described herein.

Computing device 900 may include or have access to various data stores. Data stores may use any known storage technology such as files, relational databases, non-relational databases, or any non-transitory computer-readable media. Computing device 900 may have unlabeled-training-data data store 930 that stores unlabeled training samples for training speech processing models. Computing device 900 may have a labeled-training-data data store 931 that stores labeled training samples for training speech processing models.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method, comprising:
obtaining a first training corpus of first training samples, wherein the first training samples are unlabeled;
computing feature vectors from the first training samples;
determining a set of pseudo tokens from the feature vectors by:
clustering at least a portion of the feature vectors into a plurality of clusters,
assigning a cluster-token to each cluster of the plurality of clusters,
determining a plurality of cluster-token sequences using the plurality of clusters, and
determining the set of pseudo tokens by performing token compression on the plurality of cluster-token sequences;
determining a plurality of pseudo-token sequences using the feature vectors and the set of pseudo tokens;
training a first neural network using the first training samples and the plurality of pseudo-token sequences;
obtaining a second training corpus of second training samples, wherein the second training corpus is labeled;

training a second neural network using the second training corpus, wherein at least a portion of the second neural network is initialized using the first neural network; and
deploying the second neural network to a production system.

2. The computer-implemented method of claim 1, wherein clustering the feature vectors comprises using k-means clustering.

3. The computer-implemented method of claim 1, comprising performing a deduplication operation on the plurality of cluster-token sequences.

4. The computer-implemented method of claim 1, wherein performing token compression comprises performing token compression using byte-pair encoding.

5. The computer-implemented method of claim 1, wherein performing token compression comprises performing token compression using subword regularization.

6. The computer-implemented method of claim 1, wherein the first neural network comprises a first encoder and a first decoder.

7. The computer-implemented method of claim 1, wherein the first neural network comprises a transducer neural network.

8. The computer-implemented method of claim 7, wherein the transducer neural network comprises a joint network.

9. A system, comprising at least one server computer comprising at least one processor and at least one memory, the at least one server computer configured to:
obtain a first training corpus of first training samples, wherein the first training samples are unlabeled;
compute feature vectors from the first training samples;
determine a set of pseudo tokens from the feature vectors by:
clustering at least a portion of the feature vectors into a plurality of clusters,
assigning a cluster-token to each cluster of the plurality of clusters,
determining a plurality of cluster-token sequences using the plurality of clusters, and
determining the set of pseudo tokens by performing token compression on the plurality of cluster-token sequences;
determine a plurality of pseudo-token sequences using the feature vectors and the set of pseudo tokens;
train a first neural network using the first training samples and the plurality of pseudo-token sequences;
obtain a second training corpus of second training samples, wherein the second training corpus is labeled;
train a second neural network using the second training corpus, wherein at least a portion of the second neural network is initialized using the first neural network; and
deploy the second neural network to a production system.

10. The system of claim 9, wherein the first neural network comprises a first encoder and a first decoder.

11. The system of claim 10, wherein:
a second encoder of the second neural network is initialized using the first encoder of the first neural network; and
a second decoder of the second neural network is initialized using the first decoder of the first neural network.

12. The system of claim 10, wherein the first encoder comprises a transformer encoder and the first decoder comprises a transformer decoder.

13. The system of claim 10, wherein the first encoder comprises a recurrent neural network.

14. The system of claim 10, wherein the first encoder comprises a convolutional neural network.

15. The system of claim 9, wherein the at least one server computer is configured to compute the feature vectors by performing average pooling.

16. One or more non-transitory, computer-readable media comprising computer-executable instructions that, when executed, cause at least one processor to perform actions comprising:

obtaining a first training corpus of first training samples, wherein the first training samples are unlabeled;

computing feature vectors from the first training samples;

determining a set of pseudo tokens from the feature vectors by:

clustering at least a portion of the feature vectors into a plurality of clusters, assigning a cluster-token to each cluster of the plurality of clusters, determining a plurality of cluster-token sequences using the plurality of clusters, and determining the set of pseudo tokens by performing token compression on the plurality of cluster-token sequences;

determining a plurality of pseudo-token sequences using the feature vectors and the set of pseudo tokens;

training a first neural network using the first training samples and the plurality of pseudo-token sequences;

obtaining a second training corpus of second training samples, wherein the second training corpus is labeled;

training a second neural network using the second training corpus, wherein at least a portion of the second neural network is initialized using the first neural network; and deploying the second neural network to a production system.

17. The one or more non-transitory, computer-readable media of claim 16, wherein the first neural network comprises a first encoder and a first decoder.

18. The one or more non-transitory, computer-readable media of claim 16, wherein the second training corpus is labeled with text corresponding to the second training samples and the production system performs speech recognition.

19. The one or more non-transitory, computer-readable media of claim 16, wherein training the first neural network comprises optimizing a connectionist temporal classification objective function.

20. The one or more non-transitory, computer-readable media of claim 16, wherein a portion of the second neural network is initialized with random values.

* * * * *